United States Patent [19]

Overcashier et al.

[11] Patent Number: 4,635,500

[45] Date of Patent: Jan. 13, 1987

[54] EPOXY STEERING WHEEL

[75] Inventors: Robert H. Overcashier, Santa Rosa, Calif.; Robert D. Farris, Katy, Tex.

[73] Assignee: Shell Oil Company, Houston, Tex.

[21] Appl. No.: 757,758

[22] Filed: Jul. 22, 1985

Related U.S. Application Data

[60] Continuation of Ser. No. 613,499, May 24, 1984, abandoned, which is a division of Ser. No. 448,540, Dec. 10, 1982, Pat. No. 4,473,520.

[51] Int. Cl.$^4$ .............................................. B62D 1/04
[52] U.S. Cl. ..................................... 74/552; 29/159 B
[58] Field of Search .............. 74/552; 29/159 B, 159.3

[56] References Cited

U.S. PATENT DOCUMENTS

| | | | |
|---|---|---|---|
| 1,370,023 | 3/1921 | Kempton | 74/552 |
| 1,492,363 | 4/1924 | Edson | 74/552 |
| 1,569,888 | 1/1926 | Sheller | 74/552 |
| 1,823,980 | 9/1931 | Karrer | 74/552 |
| 3,135,640 | 6/1964 | Kepka et al. | 264/314 X |
| 3,177,105 | 4/1965 | Wiltshire | 264/314 X |
| 3,613,476 | 10/1971 | Cunningham | 74/552 X |
| 3,892,831 | 7/1975 | Robin et al. | 264/314 X |
| 3,975,479 | 8/1976 | McClean | 264/102 |
| 4,201,830 | 5/1980 | Wollen | 74/552 X |
| 4,419,908 | 12/1983 | Reikowski | 74/552 |

FOREIGN PATENT DOCUMENTS

| | | | |
|---|---|---|---|
| 858965 | 12/1940 | France | 74/552 |
| 53-165038 | 7/1980 | Japan | 74/552 |
| 1571902 | 7/1980 | United Kingdom | 74/552 |
| 1582846 | 1/1981 | United Kingdom | 74/552 |
| 2061848 | 5/1981 | United Kingdom | 74/552 |
| 2063145 | 6/1981 | United Kingdom | 74/552 |

Primary Examiner—Gary L. Smith
Assistant Examiner—Rodney M. Lindsey

[57] ABSTRACT

An automotive steering wheel wherein fiber reinforcing members are placed around a core member that is placed in a mold cavity to form the rim and spoke portions of a steering wheel the mold cavity is then evacuated to remove air trapped in the reinforcing fibers while injecting a thermosetting resin at a high rate to bond the reinforcing assembly into a solid mass.

1 Claim, 10 Drawing Figures

EPOXY STEERING WHEEL

RELATED APPLICATIONS

This application is a continuation of patent application Ser. No. 613,499 filed 5/24/84, now abandoned same title, which is a division of patent application Ser. No. 448,540, filed Dec. 10, 1982, which has subsequently issued Sept. 24, 1984, as U.S. Pat. No. 4,473,520 entitled "Method for Making an Automotive Steering Wheel." The inventors throughout all of these applications remain Robert H. Overcashier and Robert D. Farris.

BACKGROUND OF THE INVENTION

The present invention pertains to automotive steering wheels and more particularly, to a fiber-reinforced resin steering wheel. In a fiber-reinforced resin steering wheel a thermosetting resin, for example epoxy resin, is reinforced with a fiber material, for example glass or carbon fibers, and molded to a suitable shape or contour in a mold. The hub of the steering wheel is normally formed of metal which is placed in the mold and bonded to the fiber resin reinforcing material.

In a United Kingdom Pat. No. 2,063,145, there is disclosed a fiber resin reinforced steering wheel. The patent discloses a steering wheel whose rim and spoke portions are formed from a lightweight, hollow member or tube which is surrounded by a fiber-reinforced resin material. The steering wheel is fabricated by placing the flexible tube surrounded by the fiber-reinforcing which is preimpregnated with resin in a suitable mold. The mold is heated while supplying a high pressure gas to the inner flexible tube to expand the tube to press the surrounding fiber-reinforced resin against the mold cavity and allowing the thermosetting resin to set. The fiber reinforcing may comprise either carbon or glass fiber which is formed in the shape of a pipe or sock which is placed or threaded over the flexible tube.

While the above method provides a relatively lightweight strong steering wheel, it has the disadvantage of requiring fiber-reinforcing that is preimpregnated. The use of preimpregnated fiber reinforcing requires a special catalyst and high temperature cure. This results in a high cost and a slow cure of the resin, thus increasing manufacturing costs. Also, voids may result from the air which is trapped in the mold and compressed by expanding the flexible tube with high pressure gas. Even if steps are taken to vent the trapped air from the mold cavity some air will remain trapped in the resin and create voids. The presence of voids in the finished product can create stress areas and in extreme cases could cause failure of the part. Also, if the outer surface is to be used as a finished surface, any voids will detract from the appearance of the finished product. In the above patent, the problem of the appearance of the outer surface is solved by covering the outer surface with plastic, leather, wood or similar covering material. While the use of a covering provides a suitable appearance to the outer surface, it does add to the cost of the steering wheel. In addition to the molding problems the use of a one piece core structure requires some means for joining the spoke to the rim. This, of course, increases the cost of the core.

SUMMARY OF THE INVENTION

The present invention solves the above problems by molding the steering wheel in an evacuated mold. By using an evacuated mold the possibility of voids caused by trapped air is eliminated. This eliminates the possibility of voids causing stress concentrations or weak points in the steering wheel structure in addition to providing an excellent appearance on the outer surface.

The steering wheel is formed by placing the fiber-reinforcing material over a flexible tube that is sealed at both ends. The flexible tube is sealed at both ends in a partially inflated condition and forms the core member of the steering wheel. The combination of the reinforcing material and flexible tube is then positioned in the mold cavity and the thermosetting resin injected into the closed mold cavity. The closed mold cavity is evacuated while heating the mold. This will accelerate the setting of the thermosetting resin as well as remove the trapped air from the mold cavity. An evacuation of the mold cavity will allow the flexible tube to inflate to its final diameter which will force the fiber-reinforced resin firmly against the mold cavity. The use of an evacuated mold eliminates the need to use preimpregnated fiber reinforcing. This allows the use of a different catalyst system that produces a repid cure and lower manufacturing costs.

An alternate construction could utilize a low density semi-rigid closed cell foam core with reinforcing material placed over the core. The foam core can be molded in any desired shape and cross section and, if desired, the metal hub can be molded in the foam. The reinforcing material is placed around the foam core and the complete structure placed in a mold. The mold is closed, evacuated, and the resin injected at a high rate while heating the mold.

BRIEF DESCRIPTION OF THE DRAWINGS

The present invention will be more easily understood from the following detailed description when taken in conjunction with the attached drawings in which.

DESCRIPTION OF THE PREFERRED EMBODIMENTS

Figure 1:
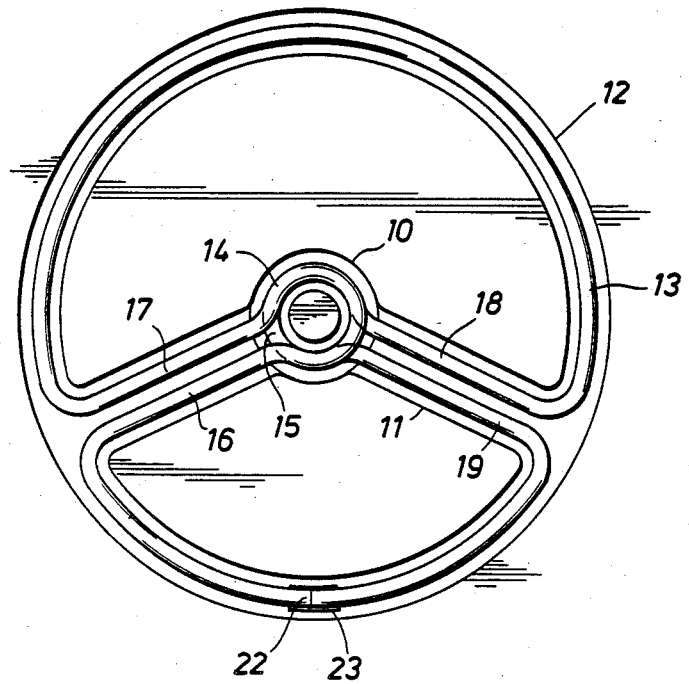
FIG. 1 is a plan view shown in section of a steering wheel constructed according to this invention.
Figure 2:
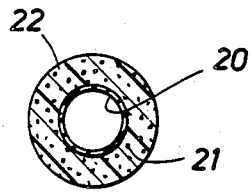
FIG. 2 is a cross section of the rim portion of the steering wheel drawn to an enlarged scale.

Referring now to FIG. 1, there is shown the fiber-reinforcing flexible tubular structure disposed in one half of the female mold. In particular, there is shown half of the mold having a rim 12 of the steering wheel which is connected by spokes 11 to the center hub section 10. The mold is designed to allow the center hub section to include a steel insert (not shown). The design of the mold is not shown in detail since it is a conventional metal used in forming fiber-reinforced thermosetting resin parts. The mold is formed in two female halves to allow materials to be placed in the mold and the mold closed and evacuated to form the part. A long length of the fiber-reinforcing tubular structure 13 whose cross section is shown in FIG. 2 is wound around the steering wheel to form the basic structure. As explained above, the fiber-reinforcing tubular structure comprises a flexible inner tube 20 that forms the core and is surrounded by fiber-reinforcing materials 21 that are set in a thermosetting resin 22. The fiber-reinforcing materials may comprise glass fibers or carbon fibers. Normally, glass fibers will be preferred due to their lower cost and with a properly designed structure they provide sufficient strength. A single length of composite material 13 is wound around the steering wheel starting at position 23. As shown, the material 13 is threaded up each spoke 11, for example at 16, looped around the center hub section at 14 and threaded back to the rim at 17. Similarly, on the other side the material is threaded up the spoke at 18 and back down at 19 to form the loop 15 around the center hub section. Using this construction, the spokes of the steering wheel are firmly attached to the hub section and the hub is firmly anchored to the steering wheel. The ends of the material 13 may be abutted and if desired an additional sleeve 23 of reinforcing fibers may be positioned over the joint.

After the composite material is placed in a mold the mold is closed and evacuated. The required resin is injected at a high rate as the mold is evacuated and the mold can also be heated to assist in setting the resin. An alternative to filling the mold with resin would be passing the composite material 13 through a suitable applicator to apply the thermosetting resin to the composite material before it is placed in the mold.

Figure 3:
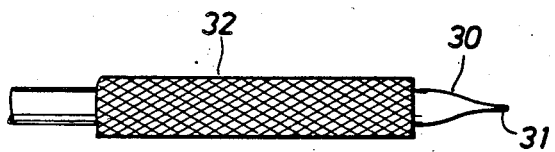
FIG. 3 is an elevation view of the flexible tube fiber-reinforcing member.
Figure 4:
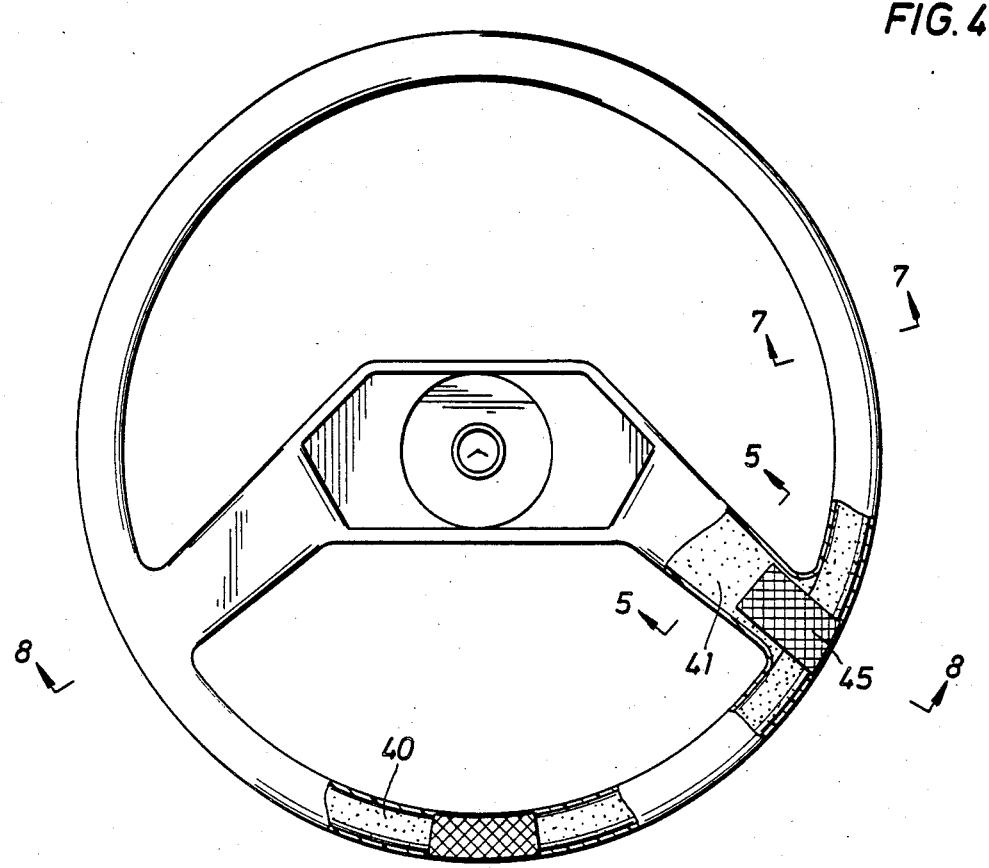
FIG. 4 is a plan view shown in section of a second embodiment of the invention.
Figure 5:
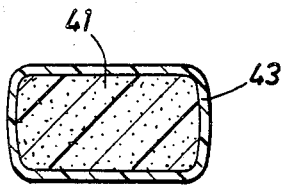
FIG. 5 is a cross section of the spoke portion of the steering wheel of FIG. 4 to an enlarged scale.

Referring to FIG. 3 there is shown the construction of a composite material 13. The material comprises a central flexible tube 30 which is sealed at both ends by suitable means 31. If the tube is formed of a heat sealable polymer material the ends may be heat sealed with the tube in a partially deflated condition so that it may expand as the mold is evacuated. A woven fiber reinforcing sock or tube 32 is threaded over the exterior of the flexible tube 30. The sock 32 can comprise a woven glass or carbon fiber sock and if desired, additional longitudinal fibers may be placed between the flexible tube 30 and the woven reinforcing tube 32 to provide additional strength to the steering wheel. The resin may be any of the various thermosetting resins such as polyester, polyvinyl ester or epoxy. Epoxy resin is preferred because of its greater adhesion to the reinforcing fibers and its greater strength.

Figure 6:
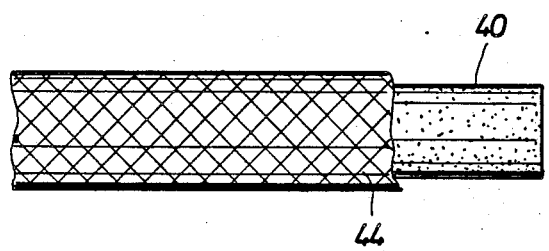
FIG. 6 is an enlarged view of the spoke portion of the steering wheel of FIG. 4.
Figure 7:
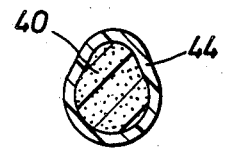
FIG. 7 is an enlarged cross section of the rim portion of the steering wheel of FIG. 4.
Figure 8:
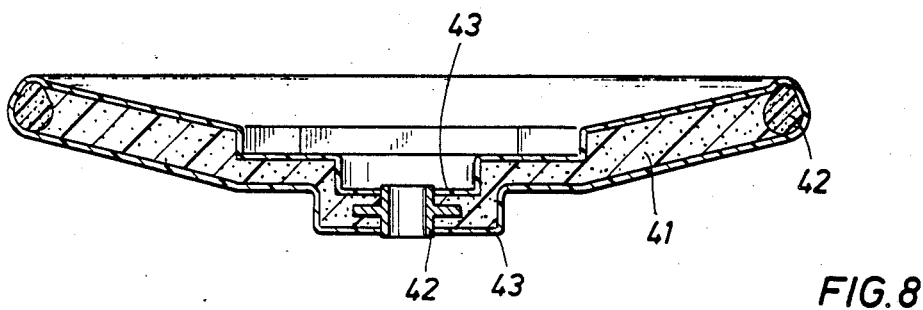
FIG. 8 is a cross section of the steering wheel along line 8—8 of FIG. 4.
Figure 9:
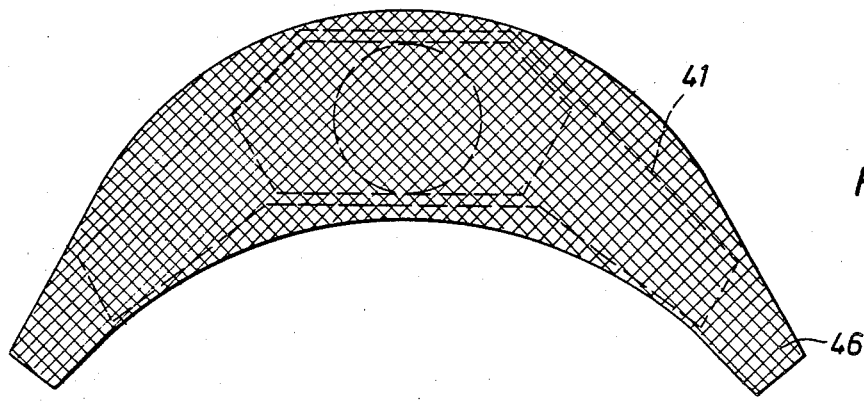
FIG. 9 is an enlarged plan view showing the reinforcing of the hub section.
Figure 10:
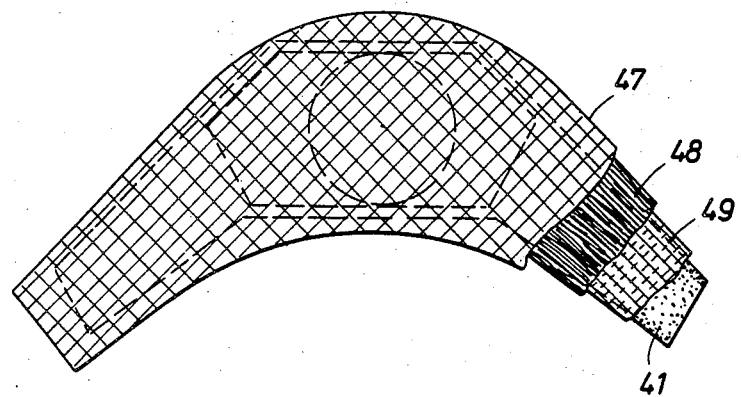
FIG. 10 is an enlarged plan view showing further details of the reinforcing of the hub section.

Referring to FIGS. 4–10, there is shown an alternate construction using a semi-rigid closed cell foam core surrounded by a fiber-reinforced resin. The foam core can be preformed from separate rim 40 and spoke 41 sections in any desired shape and may include the steel hub 42 which is molded in place as shown in FIG. 8. Of course, the hub 42 must be designed so that it is firmly anchored in the foam core and preferably attached to the fiber-reinforced resin 43. The reinforcing fiber 43 is preferably a woven tube of either glass or carbon fibers that is threaded over the spoke sections of the core. Similar reinforcing fiber 44 is threaded over the rim portion of the steering wheel as shown in FIGS. 6 and 7. The intersections between the rim and the spokes can be reinforced with woven cloth pieces 45 that surround the rim and extend along both the top and bottom of the spokes. Similar reinforcements 46 may be used to anchor the spokes to the hub section as shown in FIG. 9. An alternate reinforcement is shown in FIG. 10 in which a woven reinforcement 47 surrounds two layers 48 and 49 unidirectional fibers. A glass fiber epoxy combination is preferred because of its cost effectiveness. Greater strength is obtained by using carbon fibers but the cost is increased by a factor of three or more.

The embodiment of FIGS. 4–10 is molded the same way as described above with reference in FIG. 1. The fiber covered core and reinforcements are placed in the female mold and the mold closed. The mold is then evacuated while injecting resin at a high rate and heating the mold to set the resin.

Modifications may be made in the present invention, for example in place of woven reinforcing fibers, continuous longitudinal fibers may be used or a combination of woven and continuous fibers. This would require that the fibers be held in position on the exterior of the flexible tube by the use of an adhesive such as uncured resin.

What is claimed is:
1. An automotive steering wheel having a rim and two spokes connecting said rim to a central hub, said steering wheel comprising:
   a flexible tubular member sealed at each end, said flexible tubular member being sealed in a partially deflated condition;
   a woven tube of fiber-reinforcing material, said tube being positioned to surround said flexible tubular member, a continuous length of said flexible member and tube of fiber-reinforcing material being used to form the steering wheel by placing one end of the flexible member in a first position on the rim, passing it up one spoke around the central hub then back down said one spoke around a remainder of the rim to the second spoke, up said second spoke around said hub, back down said second spoke and around a remainder of the rim to the first position to join the other end of said flexible member with said one end of said flexible member; and
   a thermosetting resin, said resin combining with said fiber-reinforcing material to bond the reinforcing into a solid mass.

* * * * *